United States Patent
Reimnitz et al.

(10) Patent No.: US 12,374,941 B2
(45) Date of Patent: Jul. 29, 2025

(54) ELECTRICAL MACHINE HAVING A CENTRAL SUPPORT BASE FOR STATOR, ROTOR AND CONNECTION SHAFT

(71) Applicant: Schaeffler Technologies AG & Co. KG, Herzogenaurach (DE)

(72) Inventors: Dirk Reimnitz, Buhl (DE); Ivo Agner, Buhl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/030,795

(22) PCT Filed: Oct. 7, 2021

(86) PCT No.: PCT/DE2021/100811
§ 371 (c)(1),
(2) Date: Apr. 7, 2023

(87) PCT Pub. No.: WO2022/073561
PCT Pub. Date: Apr. 14, 2022

(65) Prior Publication Data
US 2025/0149934 A1    May 8, 2025

(30) Foreign Application Priority Data

Oct. 7, 2020 (DE) .......................... 102020126307.4
Aug. 24, 2021 (DE) .......................... 102021121912.4

(51) Int. Cl.
*H02K 1/18* (2006.01)
*H02K 5/173* (2006.01)
*H02K 5/22* (2006.01)
*H02K 7/08* (2006.01)
*H02K 21/24* (2006.01)

(52) U.S. Cl.
CPC .......... *H02K 1/182* (2013.01); *H02K 5/1732* (2013.01); *H02K 5/225* (2013.01); *H02K 7/083* (2013.01); *H02K 21/24* (2013.01)

(58) Field of Classification Search
CPC ...... H02K 1/182; H02K 5/1732; H02K 5/225; H02K 7/083; H02K 21/24
See application file for complete search history.

(56) References Cited

U.S. PATENT DOCUMENTS

| 4,629,920 | A | 12/1986 | Hermann | |
| 7,821,169 | B2 * | 10/2010 | Okazaki | H02K 21/24 310/156.36 |
| 10,737,567 | B2 | 8/2020 | Steinberger et al. | |
| 2006/0279150 | A1 * | 12/2006 | Kojima | H02K 11/33 310/91 |

FOREIGN PATENT DOCUMENTS

| EP | 2803865 A1 | 11/2014 |
| FR | 2809880 A1 | 12/2001 |

* cited by examiner

*Primary Examiner* — Terrance L Kenerly
(74) *Attorney, Agent, or Firm* — Volpe Koenig

(57) ABSTRACT

An electrical machine for a motor vehicle drive, including a main housing body a stator, which is fastened to the main housing body by at least one fastening element and a rotor connected to a connection shaft for conjoint rotation. The connection shaft is radially and axially supported by a main rolling element bearing, either on the main housing body directly or on the main housing body indirectly the stator.

9 Claims, 3 Drawing Sheets

ELECTRICAL MACHINE HAVING A CENTRAL SUPPORT BASE FOR STATOR, ROTOR AND CONNECTION SHAFT

CROSS-REFERENCE TO RELATED APPLICATIONS

This application is the U.S. National Phase of PCT Appln. No. PCT/DE2021/100811, filed Oct. 7, 2021, which claims the benefit of German Patent Appln. No. 102020126307.4, filed Oct. 7, 2020 and German Patent Appln. No. 102021121912.4, filed Aug. 24, 2021, the entire disclosures of which are incorporated by reference herein.

TECHNICAL FIELD

The disclosure relates to an electrical machine for a motor vehicle drive, preferably an electrical machine which is connected upstream of a transmission of a motor vehicle drive train. The motor vehicle can be implemented as a purely electrically powered or hybrid motor vehicle.

BACKGROUND

In the case of electrical machines in the field of application of motor vehicle drive trains, there is the requirement in principle to keep the position of a rotor relative to a stator as constant as possible throughout operation. This is made more difficult in particular by the dynamic processes in the motor vehicle drive, which directly influence the axial and radial position of the rotor or the connection shaft further connected to the rotor. This can result in axial and/or radial displacement and/or tilting of the rotor relative to the stator, particularly when the motor vehicle drive is subjected to high loads. The resulting change in the existing air gaps between rotor and stator in turn leads to losses in the efficiency of the electrical machine.

SUMMARY

It is therefore the object of the present disclosure to provide an electrical machine which has the greatest possible efficiency even when the motor vehicle drive is subjected to high dynamic loads.

This is achieved in accordance with aspects of the disclosure.

An electrical machine for a motor vehicle drive has a main housing body, a stator which is fastened to the main housing body by means of at least one fastening element, and a rotor which is connected for conjoint rotation to the connection shaft. The connection shaft is also radially and axially supported via a main rolling element bearing either directly on the main housing body or indirectly via the stator on the main housing body.

Due to the fastening of the stator to the main housing body and the simultaneous mounting of the connection shaft in this region, the connection shaft having the rotor is supported in a much more robust manner against a displacement and against a tilting relative to the stator. This significantly increases the efficiency of the electrical machine.

Advantageously, the stator is housed directly in a stator housing, a support wall of the stator housing that runs radially at least in sections is fastened to the main housing body by means of the at least one fastening element, and the connection shaft is fastened via the main rolling element bearing either directly to the main housing body or radially and axially supported indirectly via a radial inner side of the support wall to the main housing body.

It has turned out to be a particularly preferred embodiment if a common rigid support base is displaced inward as far as possible in the radial direction and is implemented in a radial manner as compactly as possible. In this regard, it is particularly advantageous if a direct (axial) abutment region/contact region between the stator or the support wall and the main housing body is arranged in a radial manner at the height of a radially inner half of the stator or the stator housing, viewed in the radial direction. It is also advantageous if the main rolling element bearing is in turn arranged radially within the abutment region/contact region, more preferably directly on a radial inner side of the stator or the support wall or the stator housing or the main housing body.

Further advantageous embodiments are claimed in the dependent claims and explained in greater detail below.

Accordingly, it is also advantageous if the direct abutment region/contact region between the support wall and the main housing body is arranged to be axially offset from/axially adjacent to the stator/stator housing. As a result, the abutment region can be made sufficiently large to effect a robust fastening of the stator housing to the main housing body.

Furthermore, it is advantageous if a connection structure that is offset/spaced apart from the direct abutment region between the support wall and the main housing body and runs between the main housing body and the stator housing, in particular an electrical and/or fluidic connection structure, is weaker in terms of the rigidity/strength thereof than the connection generated via the at least one fastening element. The connection structure is designed to be significantly more pliant/weaker, for example by more than 95%, than the connection produced via the at least one fastening element, in particular with regard to the rigidity thereof, for example flexural rigidity, compressive rigidity and/or torsional rigidity. This makes it possible for the stator housing to be able to carry out a certain radial and axial relative movement offset to the fastening elements, which in turn leads to a smaller relative movement between the rotor and stator.

It makes sense to design the rigidity of connection structures to be so low that, when there is a change in position (relative movement) of the fastening elements or the main rolling element bearing relative to the point on the main housing body at which the corresponding connection structures are fastened to the main housing body, at least 65% of the relative movement occurs due to the change in position of the connection structure (between the location where the connection structure is fastened to the main housing body and the location where the connection structure is fastened to the stator). It is of course even better if it is possible for even 85% or more (the more the better) of the relative movement to occur in the connection structure. Such bearing change as mentioned above can be caused by an elastic deformation of the main housing body, for example.

For the most pliant possible design of the corresponding connection structure, it is particularly advantageous if it is designed as a corrugated pipe, a curved hose, pipe sections that are inclinable on both sides and axially displaceable, a curved cable, as an elastic busbar or as an electrical conductor consisting of many thin wires.

If several fastening elements are provided, distributed preferably evenly in the circumferential direction, the connection between the stator housing and the main housing body is further strengthened.

The at least one fastening element is preferably implemented as a screw. This results in simple assembly of the electrical machine.

Furthermore, it is expedient if the at least one fastening element is aligned in the longitudinal direction thereof or with the longitudinal axis thereof parallel to an axis of rotation of the rotor. As a result, the fastening element is easily accessible for an assembly tool.

As an alternative thereto, it is also expedient if the at least one fastening element is aligned in the longitudinal direction thereof or with the longitudinal axis thereof perpendicular to an axis of rotation of the rotor. This results in an axially especially compact embodiment. In this regard, it is particularly expedient if the main housing body has a through-opening which runs radially or perpendicularly to the axis of rotation and is arranged in alignment with the fastening element, to facilitate accessibility of the fastening element.

For the most robust possible mounting of the connection shaft on the main housing body, it is also advantageous if the main rolling element bearing has an outer ring that is fixed both radially and axially (preferably axially on both sides) to the support wall and/or has an inner ring that is fixed both radially and axially (preferably axially on both sides) to the connection shaft.

In this regard, it has also proven to be advantageous if the main rolling element bearing is designed as a double-row roller bearing, for example a double-row ball bearing, preferably a double-row angular ball bearing, or a roller bearing, preferably a double-row angular roller bearing.

The bearing of the stator and rotor is further increased in terms of robustness if the connection shaft is supported on the stator housing via an additional rolling element bearing spaced apart axially from the main rolling element bearing.

The connection shaft having the rotor is supported with as little tilting as possible relative to the stator if the main rolling element bearing is arranged on a first axial side of the rotor and the additional rolling element bearing is arranged on a second axial side of the rotor, facing away from the first axial side.

The additional rolling element bearing is preferably installed in such a way that it can transmit both radial and axial forces. As an alternative thereto, however, it is also advantageous if it is designed as an axially displaceable bearing or a radially displaceable bearing. Corresponding tensions in the two bearings can thereby be avoided.

If the electrical machine is designed as an axial flow machine, the robust support between the rotor and stator has a particularly effective effect on the efficiency of the electrical machine.

Accordingly, it is also advantageous if the stator has two disk-shaped stator halves, each having a coil member, wherein the disk-shaped rotor is arranged axially between the stator halves.

In other words, a common central support base for a stator, a rotor, and an output element (connection shaft) of an electric motor (electrical machine) are thus designed according to the disclosure. In the electrical machine, preferably an electrical axial flow machine, both the stator and the rotor of the electrical machine are connected to a common, robust support base of the electrical machine, since various components connected to the electrical machine certainly exert relatively large forces on the electrical machine, in particular on the housing, the connection shaft, or an output shaft. The common, robust support base consists of two structural units that are rotationally decoupled from one another by at least one bearing (main rolling element bearing). One of the structural units is connected to the stator of the electrical machine and the other structural unit is connected to the rotor of the electrical machine. The structural units are coupled to one another by the at least one bearing. The at least one bearing allows the two structural units to rotate relative to one another about an axis of rotation. Translational movements (radial and axial) and unwanted tilting or unwanted rotational movements of the two structural units of the common robust support base relative to one another are prevented or limited to a relatively small proportion by the at least one bearing. Preferably, the common support base is located adjacent to the active parts (stator and rotor) of the electrical machine on a smallest possible diameter around the connection shaft of the electrical machine. Preferably, all other connection structures between the rotor and an adjacent electrical machine unit and between the stator and the adjacent electrical machine unit (e.g., in the form of power and cooling fluid connections) not passing through the central common support base are more pliant than the central common support base and more pliant than the structural elements of the rotor and stator between the central common robust support base and the additional connection point with an adjacent unit of the electrical machine.

BRIEF DESCRIPTION OF THE DRAWINGS

Aspects of the disclosure will now be explained in more detail with reference to figures, in which connection various exemplary embodiments are also shown.

In the figures.

The figures are only schematic in nature and serve only for understanding the disclosure. The same elements are provided with the same reference symbols. The different features of the various exemplary embodiments can also be freely combined with one another.

DETAILED DESCRIPTION

Figure 1:
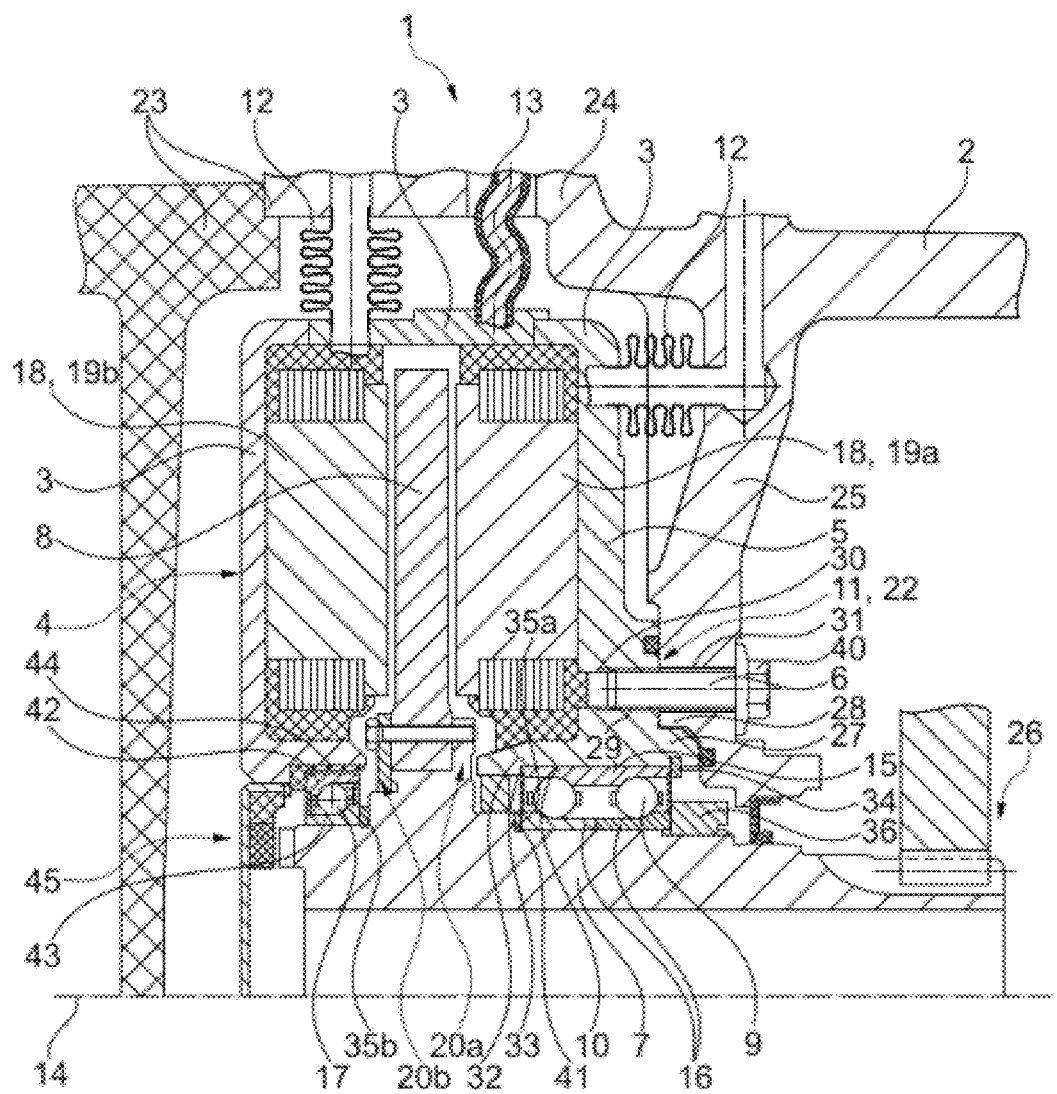
FIG. 1 shows a longitudinal sectional illustration of an electrical machine according to the disclosure according to a first exemplary embodiment, wherein a fastening element shown is aligned to be axial for connecting a stator housing to a main housing body.

The basic structure of an electrical machine 1 according to the disclosure can be seen particularly well in FIG. 1. The electrical machine 1 is used in a preferred region of application in a hybrid or purely electrically driven motor vehicle drive.

The electrical machine 1 has a housing 23 which, during operation, is connected to a transmission housing of a transmission of the motor vehicle drive, for example. The housing 23 has a main housing body 2. The main housing body 2 has both a radial outer wall 24 and an axial intermediate wall 25 projecting radially inwards from this outer wall 24.

As is explained in more detail below, a stator housing 3 is fastened to the intermediate wall 25. The stator housing 3 in turn accommodates a stator 4, here having two coil members 18.

A rotor 8 is rotatably mounted relative to the stator 4. The rotor 8 is fastened to a radial outer side of a connection shaft 7. The connection shaft 7 and rotor 8 are consequently arranged together to be coaxial to a central axis of rotation 14. The connection shaft 7 and rotor 8 form a rigid, in particular flexurally rigid, structural unit.

For the sake of completeness, it should be pointed out that the directional information used here, namely axial/axial direction, radial/radial direction, and circumferential direction, relates to this central axis of rotation 14. Consequently, axial is to be understood as a direction along the axis of rotation 14, radial is to be understood as a direction perpendicular to the axis of rotation 14, and circumferential is to be understood as a direction along a circular line that runs concentrically around the axis of rotation 14.

With regard to the connection shaft 7, it can further be seen in FIG. 1 that it protrudes through a central opening of the intermediate wall 25 and is connected outside the housing 23 with other components of the drive train, preferably via a gear connection 26. Those components can be input shafts of a gearbox or a differential gear.

With regard to the electrical machine 1, it can also be seen that this is designed as an axial flow machine in FIG. 1. The stator 4 and the rotor 8 are thus each configured essentially in the shape of a disk and are arranged to be adjacent to one another in the axial direction. The stator 4 has two disk-shaped stator halves 19a, 19b, each of which forms a coil member 18. The width of the two stator halves 19a, 19b is essentially the same. The disk-shaped rotor 8 is arranged to be axial between the two coil members 18 and interacts in the usual way with the stator halves 19a, 19b during operation to drive the rotor 8.

The stator 4, i.e., the stator halves 19a, 19b, are firmly housed in a stator housing 3. The stator housing 3 surrounds the respective stator halves 19a, 19b both radially from the outside and radially from the inside as well as in the axial direction from a side facing away from the rotor 8. In addition, the stator housing 3 is closed towards a radial outer side of the stator halves 19a, 19b/of the stator 4.

That part of the stator housing 3 which faces the intermediate wall 25 of the main housing body 2 axially forms a support wall 5. This support wall 5 extends essentially in parallel to the intermediate wall 25 and thus in the radial direction from an outer diameter of the stator 4 to an inner diameter. The support wall 5 directly forms that section of the stator housing 3 which surrounds a first stator half 19a radially from the outside, radially from the inside and on an axial side facing away from the rotor 8.

According to the present disclosure, the support wall 5 is fastened to the main housing body 2 at a central support base 22. The support wall 5 and the intermediate wall 25 rest on one another both in the axial direction with their end faces and via a centering extension 27 in the radial direction. In this embodiment, the axially protruding centering extension 27 is formed on the support wall 5 and is pushed into a recess 28/recess shoulder of the main housing body 2. In other words, a direct abutment region 11 between the support wall 5 and the main housing body 2 is arranged to be axially offset with respect to the stator 4.

For fixing/connecting the support wall 5 to/with the main housing body 2 there are several fastening elements 6 distributed in the circumferential direction, of which one fastening element 6 is illustrated in FIG. 1. The fastening element 6 is designed as screws. The respective fastening element 6 protrudes through a through-hole 31 of the main housing body 2. Each fastening element 6 also has a threaded region 29 which is screwed into an internally threaded bore 30 in the support wall 5. The fastening element 6 is supported on the main housing body 2 with a head 40.

Due to the corresponding connection of the stator 4 to the main housing body 2 by means of the fastening elements 6, these components form a further structural unit.

The support wall 5 also forms a bearing journal 32 radially inside the fastening elements 6. The bearing journal 32 protrudes radially in the axial direction from the inside into the stator 4, namely the first stator half 19a. A main rolling element bearing 9 for radial and axial support of the connection shaft 7 and thus of the rotor 8 is housed on the bearing journal 32 radially from the inside. The main rolling element bearing 9 consequently serves to support the connection shaft 7 axially and radially on a radial inner side 10 of the support wall 5.

With regard to the main rolling element bearing 9, it can be seen that a (radial) outer ring 15 of the main rolling element bearing 9 is fixed to the bearing journal 32/the support wall 5 both in the radial direction and axially on both sides. In a first axial direction/towards a first axial side of the outer ring 15, it rests against a radial shoulder 33 of the bearing journal 32; in a second axial direction/second axial side of the outer ring 15, it rests against a retaining ring 34, which is snapped into the bearing journal 32.

A (radial) inner ring 16 of the main rolling element bearing 9 is fixed on both sides of the connection shaft 7 both in the radial direction and axially. The inner ring 16 is supported in a first axial direction/to the first axial side thereof, with the interposition of a (first) abutment element 35a (here an abutment disk) on a radial shoulder 41 of the connection shaft 7 and in a second axial direction/to the second axial side thereof fixed via a securing element 36 in the form of a nut. It can also be seen that the inner ring 16 is divided into two.

The main rolling element bearing 9 is further implemented as a double-row roller bearing. The main rolling element bearing 9 is designed in particular as a double-row angular ball bearing. In further embodiments, however, the main rolling element bearing 9 can be implemented in a different way, for example as two single-row angular ball bearings or as a double-row or two single-row tapered roller bearings or as a combination of an angular ball bearing and a tapered roller bearing.

In other words, the main rolling element bearing 9 is located radially inside the fastening elements 6 and axially at least partially at the same height as the fastening elements 6. At the same time, the main rolling element bearing 9 is arranged radially inside the stator 4 and in the axial direction at the same height as the stator, in particular the first stator half 19a. Alternatively, according to further embodiments, the main rolling element bearing 9 can also be designed as a single-row bearing (e.g., deep groove ball bearing). In a further embodiment, the main rolling element bearing 9 can also be supported directly on the main housing body 2. The main rolling element bearing 9 can also be arranged in whole or in part in the axial direction at the same height as the intermediate wall.

The support base 22 is also designed in such a way that the abutment region 11 between the support wall 5/the stator 4 and the main housing body 2 is at the radial height of the radially inner half of the stator 4/stator housing 3.

Thus, the structural unit having the rotor 8 and the connection shaft 7 is supported by means of the main rolling element bearing 9 in a rigid/non-tilting manner relative to the structural unit having the stator 4 and the main housing body 2.

An additional rolling element bearing 17 is provided to further support the connection shaft 7/the rotor 8 relative to the stator 4. In this embodiment, the additional rolling element bearing 17 is realized as a (single-row) ball bearing, namely as an angular ball bearing, but in further embodiments it can also be designed in a different way.

While the main rolling element bearing 9 is arranged on a first axial side 20a of the rotor 8, the additional rolling element bearing 17 is arranged on a second axial side 20b of the rotor 8 facing away from the first axial side 20a. The additional rolling element bearing 17 is on the one hand placed directly on the connection shaft 7 and on the other hand is supported on the stator housing 3 (at the axial height of the second stator half 19b).

In this embodiment, the additional rolling element bearing 17 is coupled to the stator housing 3 in such a way that the stator housing 3 can move radially relative to an outer ring 42 of the additional rolling element bearing 17. In other embodiments, however, an additional rolling element bearing 17 is formed in the usual way, which can perform relative axial movements or neither radial nor axial relative movements. An inner ring 43 of the additional rolling element bearing 17 is in turn attached to the connection shaft 7 in a radially fixed manner.

It can also be seen that the additional rolling element bearing 17 with the inner ring 43 thereof is supported on the connection shaft 7 only axially on one side, with the interposition of a (second) abutment element 35b, here an abutment disk. The outer ring 42 of the additional rolling element bearing 17 is supported axially opposite to the support of the inner ring 43 on the stator housing 3.

The additional rolling element bearing 17 arranged on the second stator half 19b/stator housing 3 facing away from the common rigid support base 22 is thus designed as a single-row angular ball bearing and has a clearance fit between the outer ring 42 and the bearing seat of the second stator half 19b. The radial clearance of the clearance fit between the additional rolling element bearing 17 and the second stator half 19b ensures that the additional rolling element bearing 17 can perform a sufficiently large radial displacement to be able to align itself with the axis of rotation 14 set by the double-row angular ball bearing (main rolling element bearing 9). The additional rolling element bearing 17 rests axially on the bearing seat of the second stator half 19b, which is designed as a separate sleeve 44 in this exemplary embodiment. By selecting the material or the surface coating of the sleeve 44, the additional rolling element bearing 17 can be electrically insulated from the rest of the stator 4 and/or the coefficient of friction, which results at the contact point between the outer ring 42 and the sleeve 44 forming the bearing seat, can have a reduced influence in the desired way. The single-row angular ball bearing rests axially both on the bearing seat of the second stator half 19b and on the bearing seat of the rotor shaft (connection shaft 7) and can therefore transmit axial forces. The double-row angular ball bearing is in any case axially fixed on both the outer ring 15 and the inner ring 16, connected to the first stator half 19a/the stator housing 3 and the rotor shaft, and can therefore transmit axial forces even in both directions. It is thus possible for axial forces to be transmitted from one stator half 19a, 19b to the other via the rotor shaft. As a result, the bearings and the rotor shaft can help to align the two stator halves radially on the inside relative to one another so that they are exactly spaced apart axially and thus set the two air gaps between the rotor and the stator exactly and keep them consistent.

In the exemplary embodiment shown in FIG. 1, the single-row angular ball bearing together with a ball raceway of the double-row angular ball bearing located on the other side of rotor 8 (in FIG. 1 this is the ball raceway directly adjacent to rotor 8) forms an X arrangement over which the two stator halves, which would move towards one another as a result of the magnetic forces, can support one another axially. This bearing arrangement thus prevents all magnetic forces that would move the stator halves towards one another from needing to be supported radially on the outside around the rotor via the mechanical structure of the stator. The X arrangement of the bearing raceways on both sides of the rotor and the rotor shaft thus reduce the mechanical stress on the stator structure and thus enable a smaller, lighter and more cost-effective motor design. The double-row angular ball bearing can also be replaced as a tapered roller bearing in an O arrangement.

It can also be seen that the stator housing 3 is arranged outside of the common central support base 22 spaced apart axially and radially from the main housing body 2 and the entire housing 23. There are only individual connection structures 12, 13 in the form of fluidic connection structures 12 and electrical connection structures 13 which indirectly couple the stator housing 3 and housing 23 to one another.

In the first exemplary embodiment, two fluidic connection structures 12 and one electrical connection structure 13 are present. The fluidic connection structures 12, 13 are primarily used for introducing and removing liquids, in particular cooling liquids; the electrical connection structures 13 primarily serve to transmit electrical power. The connection structures 12, 13 are necessarily attached to the main housing body 2 on the one hand and to the stator housing 3/the stator 4 on the other hand.

The connection structures 12, 13 are designed in a targeted manner to be more pliant (more flexurally pliant, more elastic) than the support base 22. For this purpose, the electrical connection structure 13 is designed as a curved cable in this embodiment, but this can also be implemented in other ways in other embodiments. The two fluidic connection structures 12 are designed as corrugated tubes, for example. Thus, both the fluidic connection structures 12 and the electrical connection structures 13 are resilient and flexible in the axial direction and radial direction.

Figure 2:
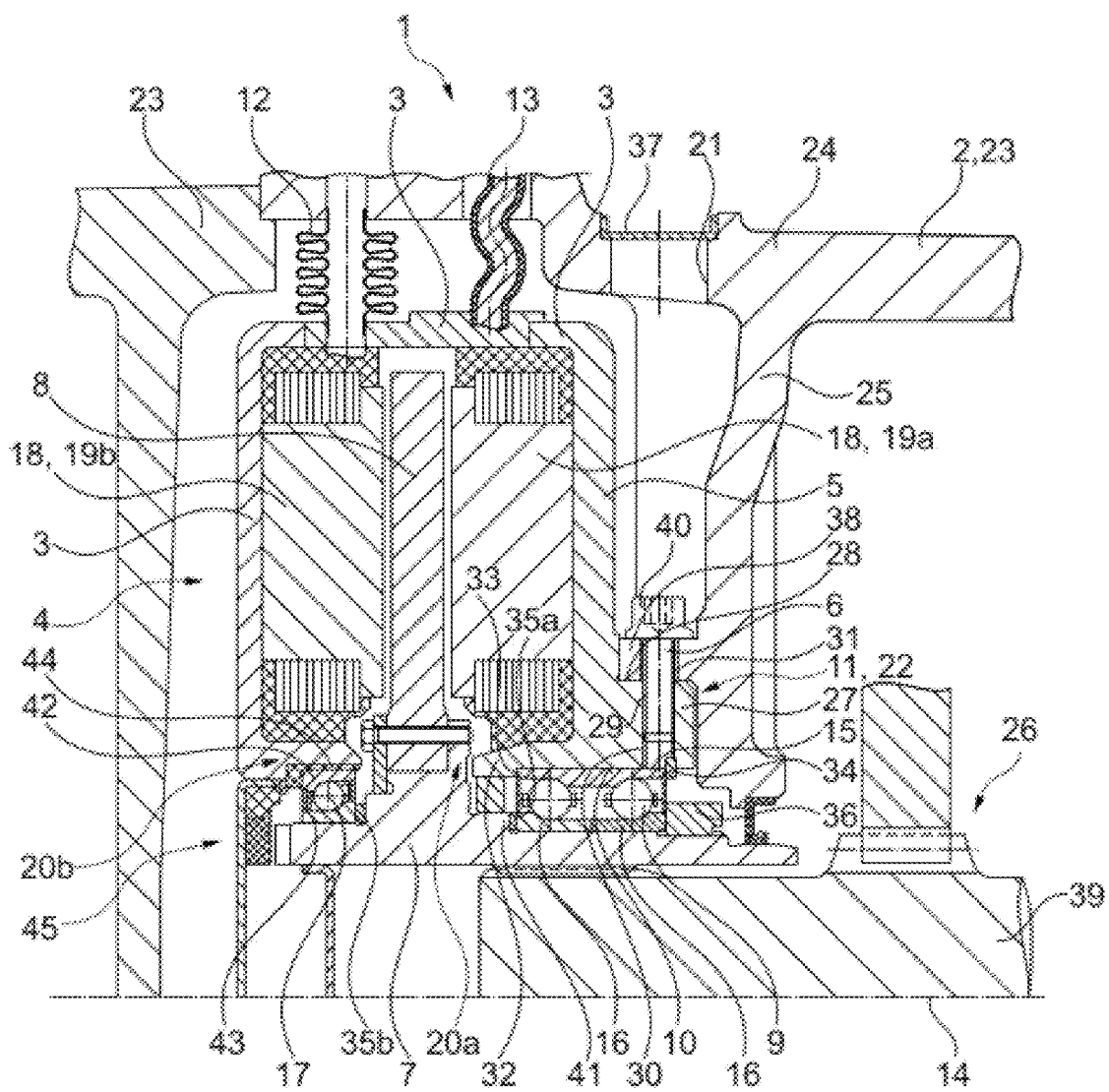
FIG. 2 shows a longitudinal sectional view of an electrical machine according to the disclosure according to a second exemplary embodiment, wherein the fastening element is aligned radially.

Finally, in connection with FIG. 2, a second exemplary embodiment of the electrical machine 1 according to the disclosure is illustrated, which corresponds to the first exemplary embodiment in the basic structure thereof. For the sake of brevity, therefore, only the differences between these two exemplary embodiments are described below.

It can be seen in FIG. 2 that the fastening element 6 is aligned not to be parallel but perpendicular to the central axis of rotation 14. The fastening element 6 is accessible radially from the outside via an axial gap between the support wall 5 and the intermediate wall 25 radially outside the support base 22. For this purpose, a through-opening 21 is made in the radial outer wall 24 of the main housing body 2 for each fastening element 6, wherein the through-opening 21 is provided in alignment with the fastening element 6. After assembly, the through-opening 21 is closed with a cover 37.

Due to the radial orientation of the fastening elements 6, the intermediate wall 25 is also adapted on the support base 22 side. The intermediate wall 25 has an axial projection 38 which radially penetrates the fastening element 6. That projection 38 rests radially from the outside on the centering extension 27 of the support wall 5.

In addition, the fastening element 6 is, of course, screwed, with the threaded region 29 thereof, into a radially running internally threaded bore 30 of the centering extension 27. It can be seen that the internally threaded bore 30 (at least in sections) is arranged at the axial height of the main rolling element bearing 9. As a result, the fastening element 6 is in turn also at the same height in the axial direction as the main rolling element bearing 9.

Furthermore, it can be seen that the connection shaft 7 in the second exemplary embodiment no longer protrudes directly from the housing 23, but forms a shaft section that is connected radially inside the main rolling element bearing 9 (via serrations) to a further output shaft 39, wherein this output shaft 39 then protrudes from the housing 23.

Figure 3:
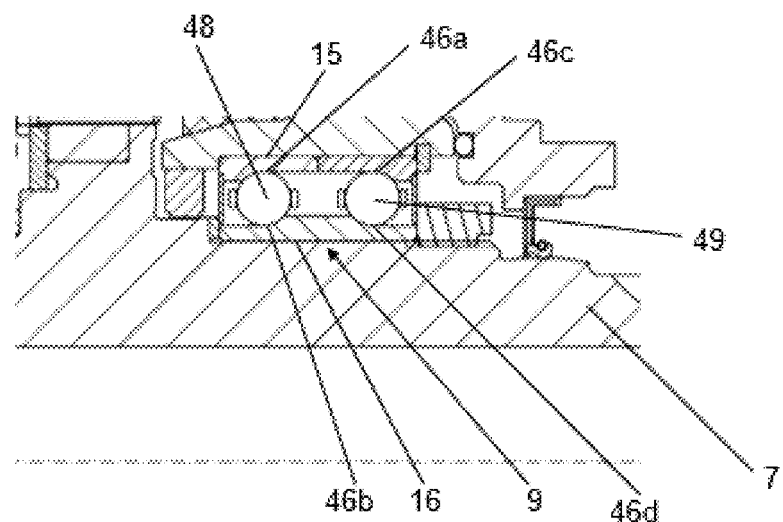
FIG. 3 shows an enlarged region of a longitudinal sectional illustration of an electrical machine according to a third exemplary embodiment.

FIG. 3 shows an enlarged region of a longitudinal sectional illustration of an electrical machine according to a third exemplary embodiment.

More specifically, FIG. 3 shows an enlarged portion showing the rolling element bearing arrangement 9 of FIG. 1 in a different configuration than that shown in FIG. 1.

Except for this other embodiment of the rolling element bearing arrangement 9, the third exemplary embodiment is identical to the first exemplary embodiment shown in FIG. 1 so that the explanations given above with regard to the first exemplary embodiment also apply to the third exemplary embodiment.

Likewise, the other configuration of the roller body arrangement 9 can be applied to the second exemplary embodiment shown in FIG. 2 so that the explanations given above with regard to the second exemplary embodiment also apply to the third exemplary embodiment.

If the connection shaft 7 is so rigidly connected to another rotatably mounted component (e.g., output shaft 39 or a transmission input shaft) that the rolling element bearing arrangement 9 does not need to stabilize the axis of rotation of the rotor 8 alone, the roller body raceways 46*a*, 46*b*, 46*c*, 46*d* of the roller body arrangement 9 are arranged so that the two roller bodies 48, 49 of the rolling element bearing arrangement 9 are positioned in an X arrangement. Since the X arrangement stabilizes the shaft to a lesser extent, the X arrangement reduces the risk that a concentricity deviation between the rolling element bearing arrangement 9 and the bearing of the component rigidly connected to the connection shaft 7 will lead to undesired stressing of the bearings and thus reduce the bearing service life.

In the case of a rolling element bearing arrangement 9 in an X arrangement, the rolling element bearing arrangement 9 is also implemented as a double-row rolling element bearing or as two single-row rolling element bearings arranged to be adjacent to one another. The rolling element bearing arrangement 9 is designed in particular as a double-row angular ball bearing. The outer ring 15 then forms two roller body raceways 46*a*, 46*c*, just as previously described for the double-row angular ball bearing in an O arrangement in FIG. 1 or FIG. 2, and the inner ring 16 also forms two roller body raceways 46*b*, 46*d*. The arrangement of these roller body raceways 46*a*, 46*b*, 46*c*, 46*d* differs from that of the O arrangement. If one imagines walking through the double-row rolling element bearing arrangement 9 in an X arrangement from left to right in FIG. 3, one first encounters a roller body raceway 46*a* on the outer ring 15, axially in front of and radially outside of the first roller bodies 48 distributed on the circumference. On the other side of this first roller body 48, there is a roller body raceway 46*b* on the inner ring, axially behind and radially inside the first roller body 48. If one then walks from left to right in FIG. 3 further axially in the same direction through the double-row rolling element bearing arrangement 9 in an X arrangement, one encounters a rolling element bearing raceway 46*d* on the inner ring axially in front of and radially inside the second roller body 49 distributed on the circumference. On the other side of the second roller body 49, there is a roller body raceway 46*c* on the outer ring, axially behind and radially outside of the second roller body 49.

The rolling element bearing arrangement 9 is implemented in an X arrangement in such a way (as a double-row angular ball bearing) that the roller body raceways 46*a*, 46*b*, 46*c*, 46*d* thereof are positioned with respect to one another in an X arrangement, i.e., a connecting line between contact points of the first roller body 48 with the roller body raceway 46*a* on the outer ring 15 and the roller body raceway 46*b* on the inner ring 16 forms a radially outwardly open V with a connecting line between contact points of the second roller bodies 49 with the roller body raceway 46*d* on the inner ring 16 and the roller body raceway 46*c* on the outer ring 15. In the rolling element bearing arrangement 9, the inner ring 15 and/or the outer ring 16 can be designed in multiple parts. In the case of the rolling element bearing arrangement 9 in an X arrangement, the outer ring 15 in particular can be designed in two parts so that the outer ring 15 is formed from two rings, each of which forms a rolling element bearing raceway.

The previously described possibility that the two stator halves support each other radially on the inside in the axial direction via the additional rolling element bearing 17, the connection shaft 7 (rotor shaft) and the rolling element bearing arrangement 9 and can thus better withstand the magnetic forces acting thereon, also exists if the rolling element bearing arrangement 9 is implemented in X arrangement.

Due to the design thereof as a single-row angular ball bearing, the additional rolling element bearing 17, see FIG. 1 and FIG. 2, has an inclined connecting line, i.e., at an angle of less than 90° and greater than 0° to the axis of rotation 14, between the contact points of the (third) roller bodies 50 thereof with a first roller body raceway 47*a* of the outer ring 42 and a second roller body raceway 47*b* of the inner ring 43. This connecting line of the additional rolling element bearing 17 forms if the rolling element bearing arrangement 9, as shown in FIG. 3, is implemented in an X arrangement with the connecting line of the rolling element bearing assembly 9 running through the second roller bodies 49 in a radially outwardly-opened V, which also corresponds to an X arrangement. This bearing arrangement made up of the additional bearing 17 and the rolling element bearing arrangement 9 in an X arrangement, which just as in the previously described bearing arrangement made up of the additional bearing 17 and the rolling element bearing arrangement 9 in an O arrangement, can thus prevent all the magnetic forces which would move the stator halves 19*a*, 19*b* toward one another, must be supported radially on the outside around the rotor 8 via the mechanical structure of the stator 4. The two stator halves 19*a*, 19*b* can thus transmit axial forces in opposite directions via the roller bodies 49, 50 arranged in an X arrangement to the connection shaft 7 (rotor shaft) and thus mutually support each other radially on the inside via the connection shaft. Of the magnetic forces which act axially on the stator halves 19*a*, 19*b* and would move the stator halves 19*a*, 19*b* towards each other, one part is then supported radially outside the rotor 8 via the mechanical structure of stator 4 and the other part via the connection shaft 7. The X arrangement on both sides of the rotor 8 and the connection shaft (rotor shaft) 7 thus reduce the mechanical load on the (radially outer) stator structure and thus enable a smaller, lighter, and more cost-effective motor design.

Figure 4:
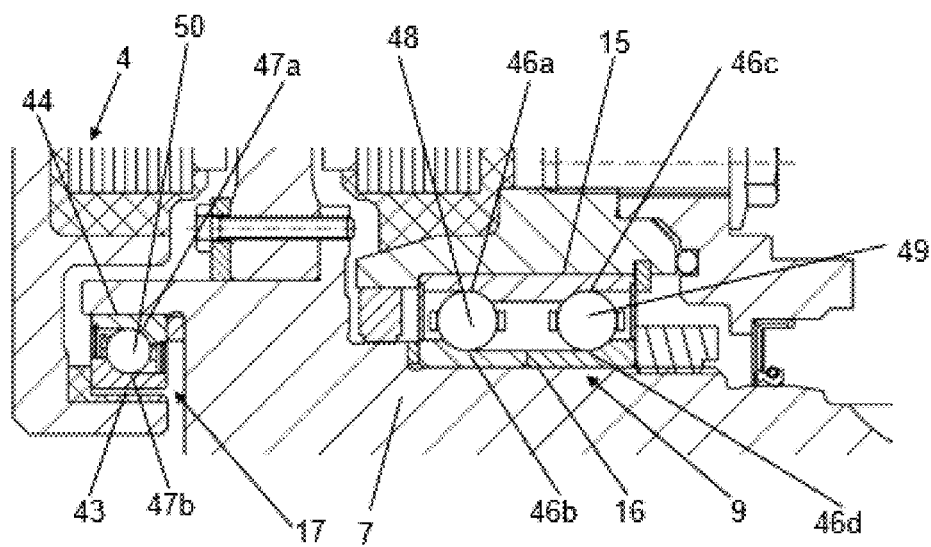
FIG. 4 shows an enlarged region of a longitudinal sectional illustration of an electrical machine according to a fourth exemplary embodiment.

FIG. 4 shows an enlarged region of a longitudinal sectional illustration of an electrical machine according to a fourth exemplary embodiment.

More specifically, FIG. 4 shows an enlarged portion showing the additional rolling element bearing 17 of FIG. 1 in a different configuration than that shown in FIG. 1.

Except for this other embodiment of the additional rolling element bearing 17, the fourth exemplary embodiment is identical to the first exemplary embodiment shown in FIG. 1, so that the explanations given above with regard to the first exemplary embodiment also apply to the fourth exemplary embodiment.

Likewise, the other configuration of the additional rolling element bearing 17 can be applied to the second exemplary embodiment shown in FIG. 2 and the third exemplary embodiment shown in FIG. 3 so that the explanations made above with regard to the second exemplary embodiment and the third exemplary embodiment also apply to the fourth exemplary embodiment.

In this variant of the additional rolling element bearing 17, in which the outer ring 44 is connected to the connection shaft 7 (rotor shaft) and the inner ring 43 is connected to the stator 4, there is also the possibility that the two stator halves can be connected via the additional rolling element bearing 17, the connection shaft 7 (rotor shaft) and the rolling element bearing arrangement 9 support each other radially on the inside in the axial direction and can thus better withstand the magnetic forces acting thereon. The additional rolling element bearing 17 is designed in particular as a single-row angular ball bearing. So that the stator half, which is in contact with the inner ring 43 of the additional rolling element bearing 17 and is capable of at least transmitting axial force, can be supported on the connection shaft 7 (rotor shaft), the inner ring 43 has a rolling element bearing raceway 47b which extends in the direction of force (force transmission from the stator half to the shaft) located in front of and radially inside the roller bodies 50 of the additional rolling element bearing 17. The outer ring 44 is connected to the connection shaft 7 (rotor shaft) and also has a rolling element bearing raceway 47a axially behind and radially outside of the roller bodies 50 of the additional rolling element bearing 17, as viewed in the direction of force. The connecting line between the contact points of the roller bodies 50 of the additional bearing 17 with the roller body raceway 47a on the outer ring 44 and the roller body raceway 47b on the inner ring 43 is oriented the other way around in this variant with respect to the previously described exemplary embodiments. Since the assignment of the inner and outer ring 43, 44 to the stator (stator half) and the rotor (connection shaft 7) is reversed, the alignment of the rolling element bearing raceways 47a, 47b must also be reversed, which changes the alignment of the connecting line between the contact points the roller body 50 with the roller body raceway 47a on the outer ring 44 and the roller body raceway 47b on the inner ring 43 so that the axial force transmission direction between the stator half and the additional shaft can remain unchanged. In the exemplary embodiment described here, the additional rolling element bearing 17 thus forms an O arrangement with one of the two roller bodies (48 or 49) of the rolling element bearing arrangement 9. (The connecting line between the contact points of the roller bodies 50 of the additional rolling element bearing 17 with the roller body raceway 47a on the outer ring 44 and the roller body raceway 47b on the bearing inner ring 43 with the connecting line between the contact points of the roller bodies 48 or 49 of the rolling element bearing arrangement 9 with their roller body raceways 46b, 46d on the inner ring 16 and the roller body raceways 46, 46c thereof on the outer ring 15 form an radially inwardly open V). These roller bodies 48, 49, 50 oriented in an O arrangement on both sides of the rotor enable an axial power transmission between the two stator halves via the additional rolling element bearing 17, the connection shaft 7 (rotor shaft), and the rolling element bearing arrangement 9. As a result, the two stator halves can mutually support one another in the axial direction, radially inside the motor, and thus better withstand the magnetic forces acting thereon. In this variant, too, the inner ring 43 and the outer ring 44 of the additional rolling element bearing 17 can each be connected axially and radially to their neighboring components, or they can only be connected axially and radially displaceably to their neighboring components. In this variant, it is particularly possible that the outer ring 44 is radially and axially firmly connected to the connection shaft 7 and the inner ring 43 is axially firmly connected (so that forces can be transmitted at least in one axial direction) to the stator (stator half) and the inner ring 43 can perform radial movements relative to the stator.

In other words, the need to make the structure of an electric motor (electrical machine 1) particularly rigid in the practical design of electric motors for motor vehicles often contradicts the requirements for compact design, low weight, high power density, and low cost that have always existed in vehicle construction.

Instead of designing all load-bearing components to be particularly rigid, robust, and large, it usually makes more sense to take additional measures or provide additional components at suitable points to ensure that the load on the neighboring parts is reduced. This description therefore presents a principle for arranging and fastening an electric motor in which forces and displacements acting on the electric motor from the outside always lead to displacements of the stator and rotor of the same magnitude and in the same direction. As a result, the position of the rotor relative to the stator remains the same even if the electric motor is displaced as a whole. This is made possible by a common rigid support base (support region between support wall/stator housing and main housing body in combination with the bearing of the rotor/connection shaft via the main rolling element bearing relative to the main housing body), on which the stator, the rotor and the output element connected to the rotor (connection shaft) are supported or mounted. The stator and rotor are rigidly connected only to the common support base or are connected to the common support base and elements that are also rigidly connected to the support base. Since the stator and the rotor are not rigidly connected to surrounding components that experience displacements or deformations other than the common rigid support base, there are also no external constraining forces or constraint deformations that can deform the structure of the stator or rotor to an unacceptable extent on the stator and the rotor and would, for example, lead to an impermissibly large change in the air gap.

So that the bearing of the rotor relative to the stator is improved by the common support base, the common support base must not allow any significant deformations between the connection point thereof for the rotor and the connection point thereof for the stator. For the common support base to be sufficiently rigid even without extreme material use, which is too expensive and too heavy for vehicle construction, it makes sense to arrange the fastening points such that the common support base provides for the components or assemblies fastened thereto to be as close together as possible. For electric motors, in particular for axial flux motors, it therefore makes sense to arrange the common rigid support base laterally (/axially) adjacent to and/or radially below the active parts of the motor on the smallest possible diameter around a component that connects the rotor with the unit that can be driven by the motor for the purpose of torque transmission (e.g., a shaft). The active parts here are the motor components of the electrical machine, through which the magnetic fields flow that cause the torque between the stator and rotor.

The common rigid support base consists of two structural units (components or assemblies) rotationally decoupled by at least one bearing (at least the main rolling element bearing). One of the assemblies is connected to the stator of the electric motor (rotationally stationary assembly of the common rigid support base) and the other of the two assemblies is connected to the rotor of the electric motor (rotatable assembly of the common rigid support base). The two structural units are fastened to one another by the at least one bearing. The at least one bearing enables the two structural units to rotate relative to one another about an axis of rotation. Translational movements of the two structural units of the common rigid support base relative to each other are prevented by the at least one bearing or limited to a very small extent. This applies in particular to radial or axial displacements of the two units relative to one another. Tilting or rotational movements of the two structural units that would not take place around the axis of rotation of the bearing are prevented by the at least one bearing or are limited to a very small extent. The assembly of the common rigid support base connected to the stator can be formed, for example, by the stator and the e-motor housing (stator housing with support wall) or by one or more components connected to the stator and/or the e-motor housing. A bearing, which connects the two structural units of the common rigid support base to one another, can be fastened both to the component assigned to the stator and/or to the component assigned to the housing (main housing body). If several bearings are arranged between the two structural units of the common rigid support base, these can all be fastened to the component associated with the stator or the component associated with the housing. At least one bearing can also be fastened to the component assigned to the stator and at least one bearing to the component assigned to the housing.

The other structural unit of the common rigid support base connected to the rotor can, for example, consist of the rotor (e.g., the rotor shaft/connection shaft) or a component connected thereto and a torque transmission element that connects the rotor to the unit that can be driven by the electric motor for the purpose of torque transmission (e.g., a shaft) or by a component connected thereto. A bearing, which connects the two structural units of the common rigid support base to one another, can be fastened both to the component assigned to the rotor and/or to the component assigned to the torque transmission element. If several bearings are arranged between the two structural units of the common rigid support base, they can all be fastened to the component assigned to the rotor or to the component assigned to the three-torque transmission element. At least one bearing can also be fastened to the component assigned to the rotor and at least one bearing can also be fastened to the component assigned to the torque transmission element.

Important aspects are (common central support base):

Both the stator and the rotor of the electric motor as well as the components adjacent to the motor that exert appreciable forces on the motor (e.g., housing and connection shaft or output shaft) are fastened to the common central rigid support base of the electric motor.

The common rigid support base consists of two structural units that are rotationally decoupled by at least one bearing. One of the units is connected to the stator of the electric motor and the other of the two units is connected to the rotor of the electric motor. The two structural units are fastened to one another by at least one bearing. The at least one bearing enables the two structural units to rotate relative to one another about an axis of rotation. Translational movements (radial and axial) and unwanted tilting or rotational movements of the two structural units of the common rigid support base relative to each other are prevented or limited to a very small extent by the at least one bearing.

The common support base is expediently arranged to be laterally adjacent to (/axially adjacent to) and/or radially adjacent to the active parts of the e-motor on the smallest possible diameter around the output shaft of the e-motor.

Any additional connections between the rotor and an adjacent e-motor unit and the stator and an adjacent e-motor unit (e.g., power or cooling fluid connections) that are not made via the central common rigid support base should be much more pliant than the central common rigid support base and the structural elements of the rotor and stator between the central common rigid support base and the additional connection point with an adjacent aggregate of the e-motor, so that the displacements that occur relatively between the central common rigid support base and the additional connection lead only to deformation on the connection elements used at the additional connection point and do not lead to deformations of the rotor or the stator.

An e-motor arrangement, in particular for an electric axle of a motor vehicle, is described:

FIG. 1 shows an e-motor arrangement that is useful for electric axles in motor vehicles. In this exemplary embodiment, the electric motor is designed as an axial flux motor. The motor consists of rotor and stator.

The stator consists of two stator halves connected to one another radially on the outside, which are connected radially on the inside via a bearing point to the rotor shaft in a rotationally decoupled manner. The rotor is fastened to the rotor shaft and consists of a disk-shaped section which extends radially outwards between the two stator halves of a stator 3. The air gaps through which the axial magnetic flux of the electrical machine runs are located between the two stator halves of a stator and the rotor. The magnetic springs of the motor cause a torque that acts on the rotor and is then introduced into the rotor shaft. The rotor shaft protrudes from the motor in the axial direction and has teeth at the end thereof, through which the torque of the motor can be transmitted to an adjacent unit. This adjacent unit can be, for example, a transmission (indicated by a spur gear stage in FIG. 1), a differential, a shaft or a wheel of the motor vehicle.

The stator half facing the transmission is connected radially on the inside to the housing that surrounds the electric motor. For this purpose the housing has a side wall or intermediate wall which is screwed to this stator half. It makes sense to arrange several screws around the circumference. A bearing (designed as a double-row angular ball bearing in an O arrangement in this exemplary embodiment) is arranged to be radially inside this screw connection point and connects the stator half to the rotor shaft in a rotationally decoupled manner. This bearing, which connects the rotor shaft axially and radially to one half of the stator and also prevents the rotor shaft from tilting about an axis that deviates from the axis of rotation of the motor, means that the rotor and stator are sufficiently supported relative to one another to form a functional unit. The region that can be seen in FIG. 1, which comprises the bearing and the screw connection, forms a common rigid support base for all the important main components.

Bearing

In the exemplary embodiment, an additional bearing (additional rolling element bearing) is optionally arranged on the side of the motor facing away from the common rigid support base, which connects the additional stator half to the rotor shaft. This bearing can be designed or installed in such a way that it can transmit radial and axial forces, or it can be designed as an axially displaceable bearing (bearing primarily transmits radial forces) or as a radially displaceable bearing (bearing primarily transmits axial forces). If the bearing transmits radial forces, the rotor shaft can be supported on either side of the rotor on a stator half. This allows the rotor shaft to be mounted very rigidly, but the two bearing points must be aligned concentrically very precisely to prevent the two bearings from being distorted. If a sufficiently precise alignment of the bearings cannot be guaranteed to prevent warping of the bearings and the associated bearing overload, it makes sense to install the bearing on the side of the motor facing away from the common rigid support base so that it can be moved radially, or to select a bearing type that already allows radial compensation between the two bearing sides. The axis of rotation of the rotor shaft is then only determined by the double-row angular ball bearing on the other half of the stator. In the exemplary embodiment shown in FIG. 1, the bearing arranged on the stator half facing away from the common rigid support base is designed as a single-row angular ball bearing that has a clearance fit between the outer ring and the bearing seat of the stator half. The radial clearance of the clearance fit between the bearing and the stator half ensures that the bearing can perform a sufficiently large radial displacement to be able to align itself with the axis of rotation defined by the double-row angular ball bearing. The bearing rests axially on the bearing seat of the stator half, which in this exemplary embodiment is designed as a separate sleeve. By selecting the material or the surface coating of the sleeve, the bearing can be electrically isolated from the rest of the stator and/or the coefficient of friction that occurs at the contact point between the bearing outer ring and the sleeve forming the bearing seat can be influenced in the desired manner. (With a high coefficient of friction, radial rotor shaft vibrations can be dampened particularly effectively, and with a low coefficient of friction, the rotor shaft aligns particularly quickly and precisely with the axis of rotation specified by the double-row angular ball bearings.) The single-row angular ball bearing rests axially both on the bearing seat of the stator half and on the bearing seat of the rotor shaft, and can therefore transmit axial forces. The double-row angular ball bearing is in any case connected to the stator half and the rotor shaft in an axially fixed manner on both the outer ring and the inner ring and can therefore transmit axial forces even in both directions. It is thus possible for axial forces to be transmitted from one stator half to the other via the rotor shaft. As a result, the bearings and the rotor shaft can help to align the two stator halves radially on the inside relative to one another so that they are exactly spaced apart axially and thus set the two air gaps between the rotor and the stator exactly and keep them consistent. In the exemplary embodiment shown in FIG. 1, the single-row angular ball bearing together with a ball raceway of the double-row angular ball bearing located on the other side of the rotor (in FIG. 1 this is the ball raceway directly adjacent to the rotor) forms an X arrangement over which the two stator halves, which would move towards one another due to the magnetic forces, can support one another axially. This bearing arrangement thus prevents all magnetic forces that would move the stator halves towards one another from needing to be supported radially on the outside around the rotor via the mechanical structure of the stator. The X arrangement of the bearing raceways on both sides of the rotor and the rotor shaft thus reduce the mechanical stress on the stator structure and thus enable a smaller, lighter and more cost-effective motor design.

Common Rigid Support Base

The exact alignment of all parts through which the magnetic fields of the motor flow is very important for the function of the electric motor. Even small deviations in the position of the parts have a major impact on the performance and efficiency of the engine. Unintentional changes in the width of the air gap between rotor and stator have a particularly large negative impact on the properties of the e-motor. An electric motor must therefore be designed and connected to the neighboring units thereof in such a way that forces occurring inside the electric motor and acting on the electric motor from the outside do not lead to an impermissibly large change in the air gap widths. To be able to support the internal forces of the electric motor effectively and inexpensively, a special bearing arrangement between the two stator halves and the rotor shaft is presented in this description. To make the electric motor insensitive to forces and displacements acting on the electric motor from the outside, a central common rigid support base is presented in this description. External forces and displacements acting on the electric motor can be caused, for example, by elastic deformations of the e-axle housing or the e-motor housing occurring when the motor vehicle is being driven. Another cause of external axial forces acting on the electric motor is often helical gearing in the units adjacent to the e-motor. If the e-motor is connected to a transmission, for example, as indicated in FIGS. 1 and 2. When the torque changes, the axial reaction forces that the helical gears exert on their bearings, shafts and housing also change. Since the support elements of the transmission (especially the support walls or side walls/main housing body and intermediate wall) are never absolutely rigid and always have a certain elasticity, a change in the torque transmitted in the drive train between the e-motor and the wheel of the vehicle due to the helical gearing almost inevitably leads to an unwanted elastic displacement of components of the drive train such as the connection shaft between the e-motor and the gearbox or the support or side wall of the housing (intermediate wall of the main housing body).

The main risks to the motor that result from these shifts are, on the one hand, that fatigue strength problems could occur in the e-motor structure due to constantly changing external forces and deformations, or that the structure would necessarily be designed from the outset for high mechanical strength, which is at the expense of power density and efficiency optimization. On the other hand, the shape of the magnetically significant air gap between the two components can be changed by deformation of the rotor and/or stator, thus degrading the performance and efficiency of the motor. In addition, the electrically and magnetically optimal design of the motor is severely restricted if a large minimum gap width must be provided so that the two components never touch during operation, since constant changes in the air gap during operation are to be expected.

If the rotor and the stator of the electric motor are fastened to components or are operatively connected to components that perform different displacements, or the components to which the stator or the rotor is fastened or with which there is an operative connection can exert forces on the e-motor, the structure of the e-motor is subjected to an impermissibly high load and/or the air gap widths are impermissibly changed. So that displacements of the e-motor housing in the region where the e-motor is fastened to the housing and/or displacements of the shaft (or a differently designed torque-transmitting connection element) between the e-motor and transmission (or a differently designed torque of the e-motor receiving unit) do not lead to a relative displacement between the active parts of the rotor and stator (the active parts of the motor are all components that serve to create the necessary magnetic fields or are flowed through by them.) or external forces acting on the motor to place loads on the structural elements of the motor that are not designed therefor, the electric motors presented here in the exemplary embodiments all have a central common rigid support base to which both the stator and the rotor of the electric motor are fastened, as well as the components adjacent to the motor, which exert significant forces on the motor (e.g., housing and connection shaft or output shaft). In FIGS. 1 and 2, the region of the central common rigid support base can be clearly seen. In FIG. 1, the central common rigid support base consists of two structural units that are rotatable relative to one another about the rotor axis of the e-motor rotor but are otherwise firmly connected to one another by the double-row angular ball bearing. One structural unit consists of the radially inner part of the stator half, which is screwed to the radially inner part of the housing support wall, which also forms part of the structural unit. The other structural unit of the central common rigid support base consists of the rotor shaft, which also forms the output shaft of the e-motor by integrally merging into the transmission input shaft. Since all components of the engine are supported on the central common rigid support base and otherwise only support each other or are connected to other neighboring components via highly elastic connection elements, all external forces and displacements acting on the electric motor affect the central common rigid support base. The common rigid support base can thereby transfer forces exerted on the engine from the outside by the transmission input shaft (or another torque-transmitting connection element designed in another way) to the support wall of the housing, without structural elements of the e-motor that do not belong to the central common rigid support base, being placed under impermissible loads by these forces. The support wall of the housing (or a differently designed fastening contour of the element carrying the e-motor) and the transmission input shaft (or a differently designed torque-transmitting connection element) are also connected to one another by the central common rigid support base such that their spatial displacements are coupled to one another. The support wall of the housing (or a differently designed fastening contour of the element carrying the e-motor) and the transmission input shaft (or a differently designed torque-transmitting connection element) can therefore only perform the same displacements (simultaneously the same direction of movement and the same displacement distance). The central common rigid support base therefore always performs the same displacement as the neighboring components that are firmly connected to the electric motor, taking the rotor and the stator with it in the same way. As a result, the rotor and stator can only perform the same displacement, which means that there is no significant relative displacement between the rotor and stator that would change the air gap widths. An axial displacement of the transmission input shaft is particularly problematic for axial flux motors having conventional bearings since it can displace the rotor axially relative to the stator and thus has a direct effect on the air gap widths; in this axial flux motor, having a central common rigid support base means that the central common rigid support base is axially displaced and thus the rotor and stator are moved together, which has no effect on the air gap width.

For the functional principle of the central common rigid support base to work well, the common support base should be sufficiently rigid so that it can transmit forces without the connection contours or connection elements that the support base provides for the components or assemblies fastened thereto deforming to a significant extent or deforming relative to each other. Therefore, it makes sense to design all the components or component regions that form the central common rigid support base to be as rigid as possible and to arrange them compactly in the immediate vicinity. The closer together that the connection contours or connection elements which the support base provides for the components or assemblies fastened thereto can be arranged, the smaller the deformations that occur between them will be. In the exemplary embodiments, the common support base is therefore arranged around the transmission input shaft on the side adjacent to the active parts of the e-motor to bring together all the important components that the common support base must connect to one another in the smallest possible space. This also results in a closely adjacent arrangement of the rigid bearing between the two structural units of the common support base and the radially inner connection (screw connection) between the stator and the housing. The arrangement of the connection point between the stator and the housing radially close above the bearing, between the stator and the rotor shaft, or between the housing and the rotor shaft is technically particularly useful. In the case of exemplary embodiment 1, this screw connection between the housing and the stator takes place axially through the side wall or support wall of the housing. To prevent oil from penetrating the e-motor through this screw connection, an O-ring is arranged between the stator and the housing radially inside and radially outside of the screw connection region. Alternatively, seals can also be arranged under the screw heads or on the screw shafts, which prevent oil from flowing through the holes in the side wall or support wall that are necessary for the screw connection. In addition, the threaded holes in the stator are sealed.

For the central common rigid support base to function well, the rotor and stator should be able to freely follow the displacement imparted to the rotor and stator by the central common rigid support base. All additional connections between the rotor and an adjacent unit of the e-motor and the stator and an adjacent unit of the e-motor that are not made via the central common rigid support base should therefore be much more pliant than the central common rigid support base and the structural elements of the rotor and stator between the central common rigid support base and the additional connection point with an adjacent unit of the e-motor, so that the displacements that occur relatively between the central common rigid support base and the additional connection point only lead to deformations on the connection elements used at the additional connection point and not to deformation of the rotor or the stator. In the figures, therefore, the connection elements indicated for the cooling fluid and the electric current are depicted as flexible connection elements (corrugated pipe and cable laid in a curved manner). Alternatively, for example, hoses or pipe sections designed to be inclinable on both sides and axially displaceable can also be used to transfer the cooling fluid between the stator and the unit providing the cooling fluid. Alternatively, elastic busbars or electrical conductors consisting of many thin wires can also be used to transmit the electrical current.

In FIG. 1, on the left adjacent to the single-row angular ball bearing, a rotor position sensor 45 is fastened to the stator half there, which sensor detects the angular position of the rotor shaft. This allows the angular position of the magnets installed in the rotor to be determined relative to the magnets in the stator. This information is used to control the motor.

In FIG. 1, a shaft grounding element is arranged between the rotor and the double-row angular ball bearing. This can prevent a significant electrical voltage from building up between the bearing outer ring and the bearing inner ring, which could lead to damage of the bearing.

FIG. 2 shows a further exemplary embodiment in which the connection point between the housing wall (intermediate wall) and the stator is realized by a radial screw connection. In this exemplary embodiment, in which a gearbox is connected to the housing wall designed as a support wall for the e-motor, this radial screw connection enables the electric motor to be assembled or dismantled without needing to use tools to reach into the housing region of the gearbox. (This is necessary in the exemplary embodiment of FIG. 1 because the screws arranged axially there penetrate through the support wall of the housing and must be assembled or disassembled from the transmission side.) To assemble the electric motor shown in FIG. 2, it is inserted axially into the motor housing and pushed onto the centering seat of the support wall until the axially acting stop surface of the stator rests against the corresponding stop surface of the support wall. The circumferential orientation of the stator is such that the radial threaded holes in the stator match the radial through-holes in the fastening contour of the support wall and the electrical connections and the cooling fluid connections are also in the right place. The fastening screws are then inserted radially from the outside into the motor housing through openings in the motor housing that can later be closed with covers and are screwed into the threaded holes. In the exemplary embodiment, the screws are equipped with a particularly high head so that the screws can be held well with a tool and securely assembled and disassembled (without falling into the motor housing). To avoid unwanted tensioning of the two components to be screwed together on the cylindrical centering seat between the support wall and the stator, the radial assembly play should be limited to the dimension absolutely necessary for the assembly by means of an exact and tight fit. If the assembly process allows it, a slight oversize is also useful (e.g., a transition or press fit).

In the exemplary embodiment shown in FIG. 2, the rotor shaft is connected to the transmission input shaft by splines (alternatively, it can also be a differently designed torque-transmitting connection element for a unit of the drive train that absorbs the torque of the engine.). This transmission input shaft can be supported in the radial direction via the rotor shaft on the common rigid support base. The spline between the rotor shaft and the transmission input shaft can be assumed to be quasi-rigid as soon as high torques are transmitted in the spline, since the contact forces acting on the tooth flanks are then very high. To be able to move the transmission input shaft axially relative to the rotor shaft, a very high axial frictional force must then be overcome. Thus, in the exemplary embodiment in FIG. 2 as well, the transmission input shaft can transmit unwanted forces and displacements to the rotor. In this exemplary embodiment as well, the central common rigid support base ensures that these forces and displacements do not have a negative effect on the air gaps between rotor and stator. In the exemplary embodiment of FIG. 2, the connection point between the rotor shaft and the transmission input shaft is functionally a part of the central common rigid support base.

In the exemplary embodiment of FIG. 2, the electric motor is protected from the transmission oil by a radial shaft sealing ring between the support wall and the rotor shaft, and by a cover which closes the axial inner through-opening in the rotor shaft. This sealing concept can also be transferred to the exemplary embodiment in FIG. 1.

Notes

The connection point between the support wall and the rotor of the e-motor has been arranged on the smallest possible diameter in the exemplary embodiments to show how a support base that is as rigid as possible can be created in which only minimal, negligible elastic deformations occur between the components or component regions connected to the support base. If it is not structurally possible to pull the support wall of the motor housing (intermediate wall of the main housing body) so far radially inwards (e.g., because the required installation space is not available or the support wall becomes too pliant as a result), it is also possible to use the connection point between the stator and housing (screw connection) further radially to the outside. This increases the distance between the connection point between the stator and the housing (screw connection) and the bearing between the two structural units of the support base. This makes the support base a little more elastic, but in the overall context of a real e-motor connection it can definitely be a technically sensible compromise. In extreme cases, the connection point between the stator and the housing (screw connection) can be moved radially outwards to near the outer diameter of the stator.

The single-row and double-row angular ball bearings shown in the exemplary embodiments are always shown only as examples of bearings having these properties. In all of the exemplary embodiments, it is always possible to use bearings of a different design, which can transmit the radial forces, axial forces, and/or tilting moments to be transmitted at this bearing point. To enable the bearing rigidity required for the common rigid support base, the double-row angular ball bearing can also be replaced by two tapered roller bearings in an O arrangement that are even more rigid due to the design.

The common rigid support base and bearing arrangement for the rotor shaft presented here are particularly useful for axial flux motors, since these e-motors are particularly sensitive to axial forces acting thereon due to their slim, disk-shaped design. However, the common rigid support base and bearing arrangement for the rotor shaft are also useful for all other e-motors to reduce the axial force load on the structure of the e-motors.

In this description, "drive train" is understood to mean all components of a motor vehicle that generate the power for driving the motor vehicle and transmit it to the road via the vehicle wheels.

Although the present disclosure has been described above in terms of embodiments, it is to be understood that various modifications and changes can be made without departing from the scope of the present disclosure as defined in the appended claims.

With regard to further features and advantages of the present disclosure, reference is expressly made to the disclosure of the drawing.

LIST OF REFERENCE SYMBOLS

1 Electrical machine
2 Main housing body
3 Stator housing
4 Stator
Support wall
6 Fastening element
7 Connection shaft
8 Rotor
9 Main rolling element bearing
Inner side
11 Abutment region
12 Fluidic connection structure
13 Electrical connection structure
14 Axis of rotation
Main rolling element bearing outer ring
16 Main rolling element bearing inner ring
17 Additional rolling element bearing
18 Coil member
19a First stator half
19b Second stator half
20a First axial side
20b Second axial side
21 Through-opening
22 Support base
23 Housing
24 Outer wall
25 Intermediate wall
26 Gear connection
27 Centering extension
28 Recess
29 Threaded region
30 Internal thread bore
31 Through-hole
32 Bearing journal
33 Shoulder of the bearing journal
34 Securing ring
35a First abutment element
35b Second abutment element
36 Securing element
37 Cover
38 Projection
39 Output shaft
40 Head
41 Shoulder of connection shaft
42 Outer ring of the additional rolling element bearing
43 Inner ring of the additional rolling element bearing
44 Sleeve
45 Rotor position sensor
46a First roller body raceway of the rolling element bearing arrangement
46b Second roller body raceway of the rolling element bearing arrangement
46c Third roller body raceway of the rolling element bearing arrangement
46d Fourth roller body raceway of the rolling element bearing arrangement
47a First roller body raceway of the additional rolling element bearing
47b Second roller body raceway of the additional rolling element bearing
48 First roller body
49 Second roller body
50 Third roller body

The invention claimed is:

1. An electrical machine for a motor vehicle drive comprising:
a main housing body, a stator fastened to the main housing body with at least one fastening element, and a rotor connected for conjoint rotation with a connection shaft, the connection shaft being radially and axially supported via a main rolling element bearing either directly on the main housing body or indirectly via the stator on the main housing body, wherein the stator is housed directly in a stator housing, a support wall of the stator housing extending radially at least in sections is radially and axially supported by the at least one fastening element fastened onto the main housing body, and the connection shaft via the main rolling element bearing either directly on the main housing body or via a radial inner side of the support wall indirectly on the main housing body, wherein a direct abutment region between the support wall and the main housing body is arranged to be axially offset with respect to the stator, and a connection structure offset from the direct abutment region between the support wall and the main housing body and extending between the main housing body and the stator housing, the connection structure being more pliant in terms of rigidity than a connection created via the at least one fastening element.

2. The electrical machine according to claim 1, wherein a plurality of fastening elements are distributed in a circumferential direction.

3. The electrical machine according to claim 1, wherein the at least one fastening element is aligned in a longitudinal direction thereof in parallel or perpendicular to an axis of rotation of the rotor.

4. The electrical machine according to claim 1, wherein the main rolling element bearing has an outer ring fixed both radially and axially on at least one of the stator, the main housing body or an inner ring fixed both radially and axially to the connection shaft.

5. The electrical machine according to claim 1, wherein the connection shaft is supported on the stator via an additional rolling element bearing spaced apart axially from the main rolling element bearing.

6. The electrical machine according to claim 5, wherein the main rolling element bearing is arranged on a first axial side of the rotor and the additional rolling element bearing is arranged on a second axial side of the rotor facing away and outwards from one of the first axial sides.

7. The electrical machine according to claim 1, wherein the electrical machine is an axial flux machine.

8. The electrical machine according to claim 1, wherein the stator has two disk-shaped stator halves, each having a coil member, wherein the disk-shaped rotor is arranged to be axial between the stator halves.

9. An electrical machine for a motor vehicle drive comprising:
a main housing body;
a stator fastened to the main housing body with at least one fastening element;
a rotor; and
a connection shaft connected for conjoint rotation with the rotor; and
a main rolling element supporting the connection shaft radially and axially;

wherein the main rolling element supports the connection shaft on at least one of the main housing body or the stator;

wherein the stator is housed in a stator housing, the stator housing including a radially extending support wall, the at least one fastening element radially and axially supporting the stator housing, and wherein the connection shaft is supported by the main rolling element either directly on the main housing body or via a radial inner side of the support wall;

wherein a direct abutment region between the support wall and the main housing body is axially offset with respect to the stator; and a connection structure offset from the direct abutment region between the support wall and the main housing body and extending between the main housing body and the stator housing, the connection structure being relatively more pliant than a connection between the stator and the main housing body via the at least one fastening element.

* * * * *